US008536822B2

(12) United States Patent
Webb et al.

(10) Patent No.: US 8,536,822 B2
(45) Date of Patent: Sep. 17, 2013

(54) VOLTAGE-CONTROLLED STEPPER MOTOR DRIVER

(75) Inventors: Clifford W. T. Webb, Fresno, CA (US); Brian F. Reilly, Hillsboro, OR (US)

(73) Assignee: Pelco, Inc., Clovis, CA (US)

( * ) Notice: Subject to any disclaimer, the term of this patent is extended or adjusted under 35 U.S.C. 154(b) by 235 days.

(21) Appl. No.: 13/070,410

(22) Filed: Mar. 23, 2011

(65) Prior Publication Data

US 2011/0234143 A1 Sep. 29, 2011

Related U.S. Application Data

(60) Provisional application No. 61/316,727, filed on Mar. 23, 2010.

(51) Int. Cl.
*H02P 1/26* (2006.01)

(52) U.S. Cl.
USPC ...... 318/729; 318/400.12; 318/632; 318/607; 318/568.18; 318/400.34; 327/159; 327/155; 327/236; 310/316.02

(58) Field of Classification Search
USPC .......... 318/316.02, 116, 696, 400.14, 400.34, 318/568.22, 608, 685, 66, 430, 723, 400.13, 318/724, 400.03, 400.04, 400.11; 327/159, 327/155, 236; 310/316.02
See application file for complete search history.

(56) References Cited

U.S. PATENT DOCUMENTS

| 4,284,940 | A | * | 8/1981 | Welburn | 318/696 |
|---|---|---|---|---|---|
| 4,584,512 | A | * | 4/1986 | Pritchard | 318/696 |
| 4,929,879 | A | * | 5/1990 | Wright et al. | 318/696 |
| 5,449,986 | A | * | 9/1995 | Dozor | 318/400.14 |
| 5,825,151 | A | * | 10/1998 | Ikawa et al. | 318/685 |
| 5,914,580 | A | * | 6/1999 | Senoh | 318/696 |
| 6,002,234 | A | * | 12/1999 | Ohm et al. | 318/729 |
| 6,140,793 | A | * | 10/2000 | Carr et al. | 318/696 |
| 6,262,544 | B1 | * | 7/2001 | Disser et al. | 318/245 |
| 6,271,641 | B1 | * | 8/2001 | Yasohara et al. | 318/685 |
| 2007/0040529 | A1 | * | 2/2007 | Takebayashi et al. | 318/685 |

FOREIGN PATENT DOCUMENTS

| JP | 07123788 | A | | 5/1995 |
|---|---|---|---|---|
| JP | 2006129624 | A | * | 5/2006 |
| JP | 2006149143 | A | | 6/2006 |
| JP | 2008072876 | A | | 3/2008 |
| JP | 2008295205 | A | * | 12/2008 |
| KR | 1020030090234 | A | | 11/2003 |

* cited by examiner

*Primary Examiner* — Eduardo Colon Santana
*Assistant Examiner* — Jorge Carrasquillo
(74) *Attorney, Agent, or Firm* — Hunter Clark PLLC

(57) ABSTRACT

A stepper motor driver system includes: a digital signal controller configured to digitally synthesize synthesized analog voltage signals that will induce a desired velocity of a stepper motor when applied to a pair of stepper motor windings; and voltage amplifiers, communicatively coupled to the digital signal controller, configured to amplify the synthesized analog voltage signals to produce amplified analog voltage signals and to output the amplified analog voltage signals; where the digital signal controller is configured to synthesize the analog voltage signals by affecting at least one of a phase or an amplitude of each of the analog voltage signals as a function of the desired velocity of the stepper motor.

11 Claims, 7 Drawing Sheets

VOLTAGE-CONTROLLED STEPPER MOTOR DRIVER

CROSS-REFERENCES TO RELATED APPLICATIONS

This application claims the benefit of priority from U.S. Provisional Patent Application No. 61/316,727, filed Mar. 23, 2010.

BACKGROUND

A stepper motor positioning system for pan/tilt/zoom (PTZ) surveillance cameras has several stringent desired characteristics. First, such a system should have very accurate positioning when coming to a stop, with no position feedback, i.e., static positioning accuracy. Second, the system should have very smooth motion at low speed, namely, low variation of angular velocity, when moving in unstable mechanical systems. A typical stepper motor and motor load have multiple frequencies of high-Q resonances which are energized at specific angular velocities. Third, the system should be capable of implementing high speed positive/negative acceleration profiles to change position quickly. Fourth, the system should be very power efficient, as security domes of PTZ cameras have limited power available and limited means for dissipating thermal energy generated in the motor and the motor drive.

Referring to FIG. 7, a typical PTZ stepper motor driver 100 is a motor winding current-controlled driver. The current-controlled motor driver 100 contains digital pulse-width modulation (PWM) modules 102, 104 and H-Bridges 106, 108 to force current into motor windings 110, 112, shunt resistors 114, 116 in series with each motor winding to measure the winding current, and comparators 118, 120 that feed back the winding currents to the modules 102, 104 to vary duty cycle of the PWM modules 102, 104 to achieve desired instantaneous currents in the motor windings 110, 112. The comparators 118, 120 compare reference/control signals with the voltage generated across the shunt resistors 114, 116. The driver 100 controls the instantaneous peak current, but not the average current. Thus, when the voltage across the resistor 114, 116 crosses the reference voltage, the PWM signal switches. This causes the current to ramp up and down in a sawtooth pattern, the levels of which depend on component values and characteristics such as parasitics. The H-bridges 106, 108 can be adjusted to help reduce the swing of this sawtooth pattern, but the swing leads to position inaccuracies, and vibration and noise in the motor driven by the driver 100.

With the typical stepper motor driver, the value in Ohms of the winding current shunt resistor has competing interests. Increasing the value of the current shunt resistor yields an increase in signal/noise ratio, which provides a more accurate measurement of the winding current, resulting in an increase in the static positioning accuracy of the motor driver. Reducing the value of the current shunt resistor, however, increases the efficiency of the motor driver by reducing power loss and dissipation due to the large motor currents passing through the shunt resistor. Therefore, optimizing both efficiency and static positioning accuracy is difficult, if not impossible.

In addition, it is not practical to measure the winding current with a current shunt when both motor windings are switching from rail to rail due to the PWM generator output. Therefore, in a typical unipolar current-controlled driver the current shunt is placed in the unipolar power supply return line. At each zero crossing of the current the driver switches winding current polarity. This causes a large output error around each cardinal step (movement caused by an increment in winding driving waveforms, e.g., with four cardinal steps in a full cycle of quadrature driving waveforms) where one of the winding currents crosses zero, resulting in a larger-than-normal static positioning error. This also reduces smoothness of motion for low angular velocity as there is an error bump in the torque of the driver at each cardinal step.

Still further, the resistance in the motor winding is decoupled from the energy at the mechanical system resonances, thus providing little or no damping of the high-Q resonances. This driver is prone to uncontrolled oscillations due to undamped high-Q mechanical resonances. Typically, with current-controlled drivers the designer uses modeling and/or trial and error with built devices to determine motor velocities that induce system resonances. The designer uses the determined resonances to implement safeguards to help ensure that the system does not dwell at those velocities. The designer can implement "no-go" velocity bands around the velocities that induce system resonances, e.g., by having controlling software and/or firmware keep the velocity outside of these bands (e.g., just above or below the band) when feasible and when not feasible, to transit the bands quickly enough to avoid oscillation.

Moreover, the current-controlled driver applies large PWM voltages to the motor windings, which cause eddy currents to flow in the motor metal structures, increasing power loss and generating heat in the motor components.

Current-controlled drivers have been favored, and voltage-controlled drivers dismissed, because stepper motor position is dictated by winding current. Thus, driving with a current ensures motor position while driving with voltage could lead to unknown current and thus unknown motor position.

SUMMARY

An example of a stepper motor driver system includes: a digital signal controller configured to digitally synthesize synthesized analog voltage signals that will induce a desired velocity of a stepper motor when applied to a pair of stepper motor windings; and voltage amplifiers, communicatively coupled to the digital signal controller, configured to amplify the synthesized analog voltage signals to produce amplified analog voltage signals and to output the amplified analog voltage signals; where the digital signal controller is configured to synthesize the analog voltage signals by affecting at least one of a phase or an amplitude of each of the analog voltage signals as a function of the desired velocity of the stepper motor.

Implementations of the example stepper motor driver system may include one or more of the following features. The digital signal controller includes a phase-compensation module including a non-linear look-up table of phase-compensation values and corresponding desired stepper motor velocity values. The digital signal controller includes an amplitude module including a non-linear amplitude-scaling look-up table of amplitude-scaling values and corresponding desired stepper motor velocity values. The digital signal controller includes a phase-compensation module including a non-linear phase-compensation look-up table of phase-compensation values and corresponding desired stepper motor velocity values; the digital signal controller includes a waveform module including a waveform look-up table of quasi-sinusoidal waveform values and corresponding position values; and the digital signal controller is configured to: determine a present desired stepper motor velocity; determine a present phase-compensation value corresponding to the present desired stepper motor velocity using the phase-compensation lookup table; apply the present phase-compensation value to a present position value to produce a phase-corrected position value; determine a waveform value corresponding to the phase-corrected position value using the waveform look-up table; determine a present amplitude-scaling value corresponding to the present desired stepper motor velocity using the amplitude-scaling look-up table; and scale the waveform value using the present amplitude-scaling value to produce amplified analog voltage signals.

Also or alternatively, implementations of the example stepper motor driver system may include one or more of the following features. The voltage amplifiers are class-D amplifiers fed by a supply voltage; the digital signal processor includes a corresponding plurality of bias sources and a corresponding plurality of digital-to-analog converters (DACs); and the bias sources are coupled and configured to bias signals input to the DACs such that the amplified analog voltage signals are biased to a midpoint of the supply voltage. The amplified analog voltage signals have pseudo-sinusoidal shapes. The system further includes the stepper motor communicatively coupled to the voltage amplifiers, the voltage amplifiers consisting of four voltage amplifiers arranged in two pairs with each pair of voltage amplifiers configured and coupled across a respective winding of the stepper motor.

An example of a stepper motor system includes: a stepper motor including first and second windings and an iron rotor; synthesizing means for digitally synthesizing first pseudo-sinusoidal analog voltage signals in quadrature with respect to each other; amplifying means, communicatively coupled to the synthesizing means and the stepper motor, for amplifying the pseudo-sinusoidal analog voltage signals to produce second amplified pseudo-sinusoidal analog voltage signals and for providing the second pseudo-sinusoidal analog voltage signals to the first and second windings of the stepper motor.

Implementations of such a stepper motor system may include one or more of the following features. The synthesizing means are further for compensating the first pseudo-sinusoidal analog voltage signals for back-electromotive force produced by the stepper motor. The synthesizing means include compensating means for compensating the first pseudo-sinusoidal analog voltage signals for back-electromotive force produced by the stepper motor by affecting at least one of phase or amplitude of each of the first pseudo-sinusoidal analog voltage signals as a function of velocity of the rotor. The synthesizing means include compensating means for compensating the first pseudo-sinusoidal analog voltage signals for back-electromotive force produced by the stepper motor by affecting both phase and amplitude of each of the first pseudo-sinusoidal analog voltage signals as a function of velocity of the rotor. The compensating means include: a non-linear phase-compensation look-up table of phase-compensation values and corresponding stepper motor velocity values; a non-linear amplitude-scaling look-up table of amplitude-scaling values and corresponding desired stepper motor velocity values; and a waveform module including a waveform look-up table of quasi-sinusoidal waveform values and corresponding position values.

An example of a method of controlling a stepper motor includes: producing first and second compensated analog voltage waveforms in quadrature phase with respect to each other; amplifying the first and second analog voltage waveforms to produce first and second analog winding drive voltage waveforms; and applying the first and second analog winding drive voltage waveforms to first and second windings, respectively, of a stepper motor; where the first and second compensated analog voltage waveforms being compensated for at least one of phase or amplitude as a function of a velocity of a rotor of the stepper motor.

Implementations of such a method may include one or more of the following features. The first and second compensated analog voltage waveforms are compensated for both phase and amplitude as a function of the velocity of a rotor of the stepper motor. Producing the first and second compensated analog voltage waveforms includes: digitally synthesizing stepper motor velocity indications and corresponding stepper motor position indications; altering the stepper motor position indications based on the corresponding stepper motor velocity indications to produce phase-compensated position indications; digitally synthesizing first and second unscaled pseudo-sinusoidal voltage waveforms based on the phase-compensated position indications, the first and second unscaled pseudo-sinusoidal voltage waveforms being in quadrature phase with respect to each other; scaling the first and second unscaled voltage waveforms based on amplitude-scaling values corresponding to the stepper motor velocity indications to produce first and second scaled pseudo-sinusoidal waveforms; and converting the first and second scaled pseudo-sinusoidal waveforms from digital to analog to produce first and second scaled pseudo-sinusoidal analog waveforms as the first and second compensated analog voltage waveforms. The method may further include amplifying the first and second scaled pseudo-sinusoidal analog waveforms to produce the first and second analog winding drive voltage waveforms.

Items and/or techniques described herein may provide one or more of the following capabilities, as well as other capabilities not mentioned.

A voltage-controlled driver is provided with no feedback loop, being 100% open loop, providing a faster acting and more accurate output than current-controlled drivers. A stepper motor driver for pan/tilt/zoom (PTZ) surveillance cameras provides improved position accuracy and reduced power losses, while also providing resistive damping for high-Q resonances in the mechanical system, increasing the stability of the positioning system near and on the angular velocities where a system resonance occurs. A damping driver provides easier system design and improved performance, and can be used without "no-go" motor velocity bands.

Static motor winding current at a fixed position is given by the drive voltage divided by the motor winding resistance. Since the motor winding resistance is much larger in value than a typical current-controlled driver shunt resistor, the accuracy of the static motor winding current is often much higher in the voltage-controlled drivers discussed herein, resulting in static positioning accuracy in the voltage-controlled drivers being an order of magnitude more accurate than achievable in current-controlled drives.

Voltage-controlled drivers discussed herein do not have a current shunt in series with the motor winding. Consequently, power dissipation is reduced and power efficiency is increased compared to current-controlled drivers with shunt resistors.

Voltage-controlled drivers discussed herein do not apply large PWM voltages to motor windings. Consequently, power dissipation is reduced and power efficiency is increased compared to current-controlled drivers as eddy current losses are not induced.

Since voltage-controlled drivers discussed herein generate fully linear bipolar outputs (unlike the current-controlled driver which has zero-crossover error), voltage-controlled drivers discussed herein do not have error at zero crossover. Thus, zero-crossover static positioning errors and zero-crossover torque bumps at low velocity are avoided.

Voltage-controlled drivers discussed herein have output impedances that are very low, nearly short circuits. When a stepper motor velocity approaches a mechanical resonance, a large amount of power at the resonance frequency begins to oscillate between the electrical system and the mechanical system. On the electrical side, the resonance causes a back-EMF voltage to be generated in the motor windings at the resonance frequency. Since the motor driver outputs present very low impedances, this resonating back-EMF voltage pumps a large amount of energy into motor winding resistance, which then dissipates a significant portion of the resonant energy as heat in the motor winding, damping the resonance. The net effect is that the resistance damping of the motor winding combined with low impedances of the voltage-controlled driver outputs dampen the mechanical resonances, causing stable operation near mechanical resonance frequencies.

It may be possible for an effect noted above to be achieved by means other than that noted, and a noted item/technique may not necessarily yield the noted effect. Further, at least some implementations discussed herein or derivable from the discussion herein may not provide one or more of the capabilities discussed.

Other capabilities and applications will be made apparent by the following detailed description.

DETAILED DESCRIPTION

Techniques are provided for controlling stepper motors with voltage inputs. The motors may be used in a variety of applications such as in movable surveillance cameras. A stepper motor driver for pan/tilt/zoom (PTZ) surveillance cameras is provided that comprises a digital signal processor (DSP) microcontroller that provides voltage control signals to four efficient class-D voltage amplifiers. The amplifiers drive two stepper motor windings using four digital-to-analog converters in the DSP microcontroller. The system is preferably open-loop with no feedback. The DSP microcontroller that drives the class-D amplifiers uses very fine microstep precision at static and low angular velocity, where very accurate positioning is desired. As the angular velocity increases and the positioning accuracy tolerance increases, the DSP microcontroller may reduce the microstepping precision, e.g., at a continuous rate proportional to the angular velocity until, at high speed, the microstep precision is very low due to large increments in driving waveforms between consecutive samples. Preferably, there are no discrete changes in microstep precision levels, only continuous variation with angular velocity. As the motor slows down, the microstep precision gradually increases, reaching full precision once the motor stops.

The DSP controller takes a motor current signal generated in a present position register and transforms that signal to voltage signals to be applied to motor windings. The current-to-voltage transformation is a non-linear vector function (including amplitude and phase) based on motor winding resistance, motor winding inductance, and motor winding back-EMF (electro-motive force). The back-EMF is linearly proportional to motor velocity, with the volts output vs. angular velocity being a function of motor parameters, design, and construction, and typically provided by the motor's manufacturer. The DSP controller implements the non-linear current-to-voltage transformation using two fine-precision non-linear lookup tables (LUTs), one table for amplitude scaling and one table for phase shift compensation. The DSP controller also contains a third non-linear table to correct the sinusoidal drive signal applied to the motor windings for non-linear behavior of the motor part between cardinal steps of the motor, providing excellent static position accuracy and smoothness of motion of the motor at low speed.

Figure 1:
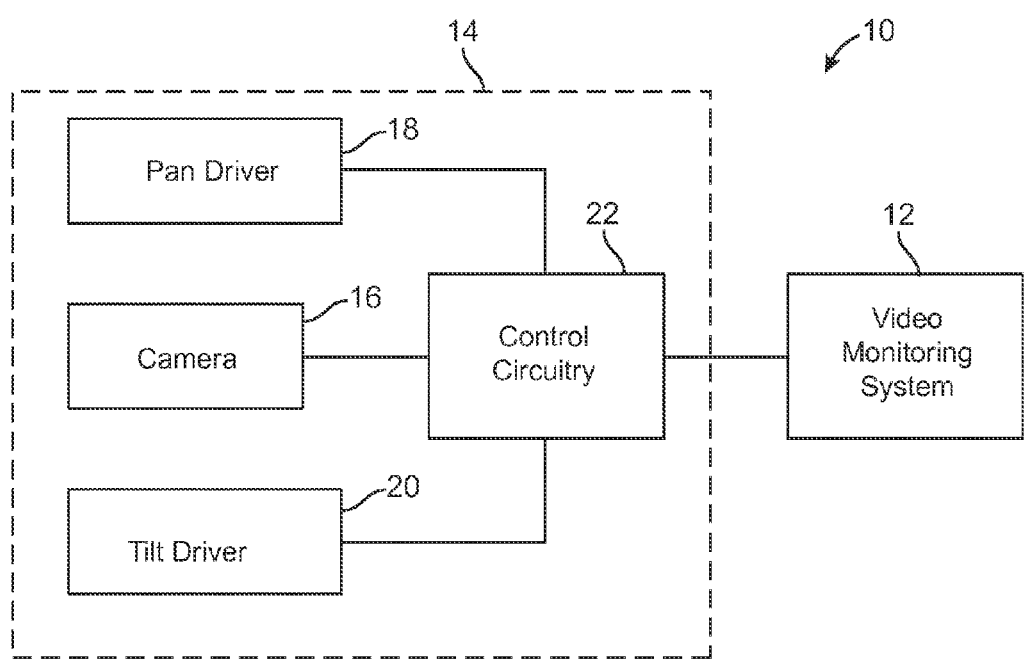
FIG. 1 is a block diagram of a video surveillance system.

Referring to FIG. 1, a video surveillance system 10 includes a video monitoring system 12 and a camera system 14. The systems 12, 14 are connected for bi-directional communication by a communication line 14, for example, an Ethernet cable such as Category 5 (CAT5) cable. The camera system 14, in this example, is a movable, pan/tilt/zoom (PTZ) system including a camera 16, a pan driver 18, a tilt driver 20, control circuitry 22. The camera system 14 can be disposed in a protective dome (not shown). The camera 16 can be, for example, a mega pixel camera and includes a zoom feature controllable by control signals received from the control circuitry 22. The pan driver 18 includes a pan motor physically connected to the camera 16 and configured to rotate the camera 16 in a horizontal plane. The tilt driver 20 includes a tilt motor physically connected to the camera 16 and configured to rotate the camera 16 in a vertical plane, with the horizontal and vertical planes being orthogonal to each other and defined relative to a default orientation of the camera 16. The pan and tilt motors are stepper motors, having motor positions determined by the difference in currents provided to two windings of each motor. The control circuitry 22 is configured to provide the pan driver 18 and the tilt driver 20 with control signals in response to signals received from the video monitoring system 12 over the communication line 14. Each of the pan driver 18 and the tilt driver 20 preferably include a voltage-controlled microstepping motor driver to move the camera 16 in the horizontal and vertical planes, respectively.

Figure 2:
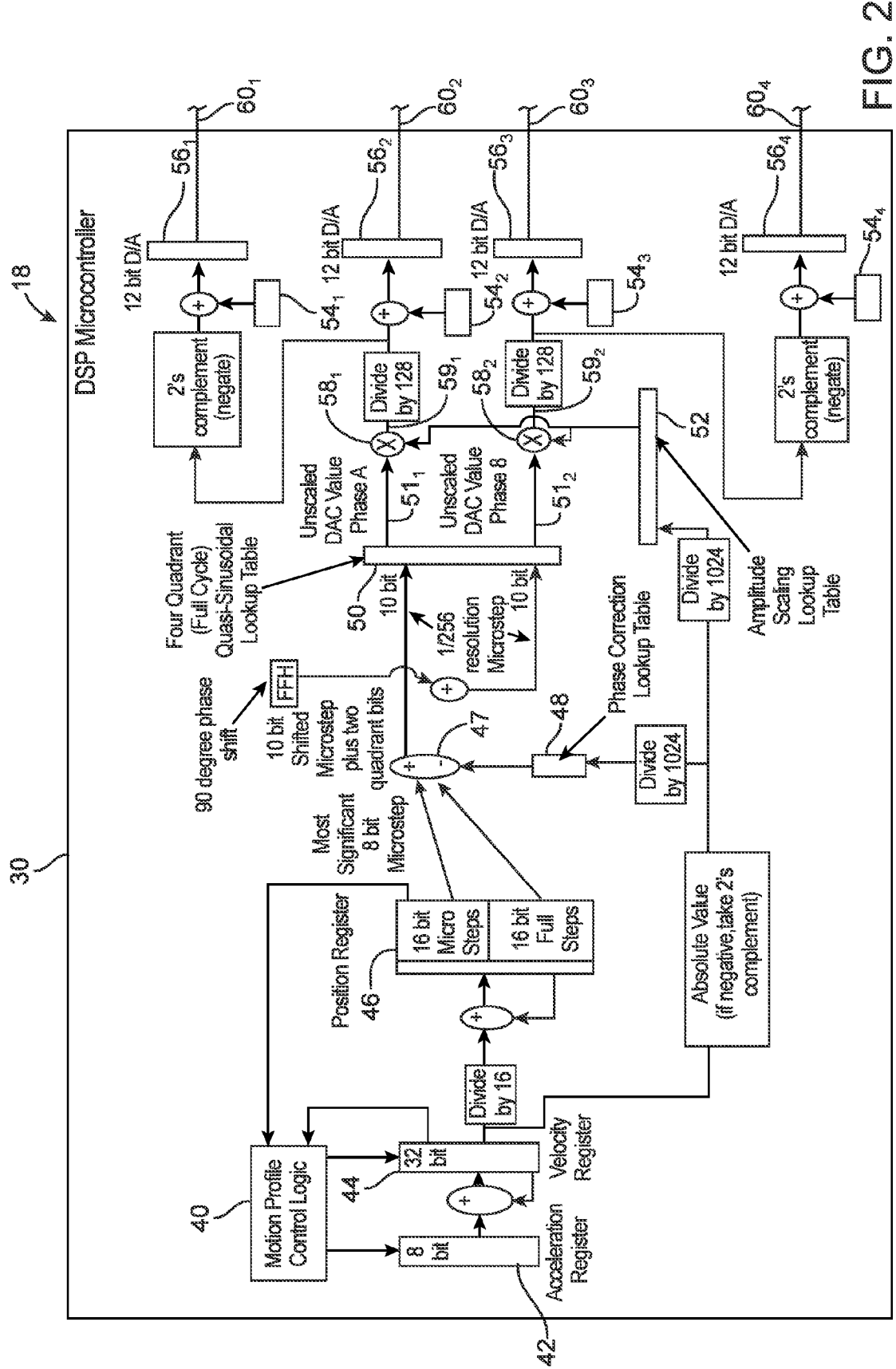
FIG. 2 is a block diagram of a digital signal processor microcontroller of a pan driver shown in FIG. 1.
Figure 3:
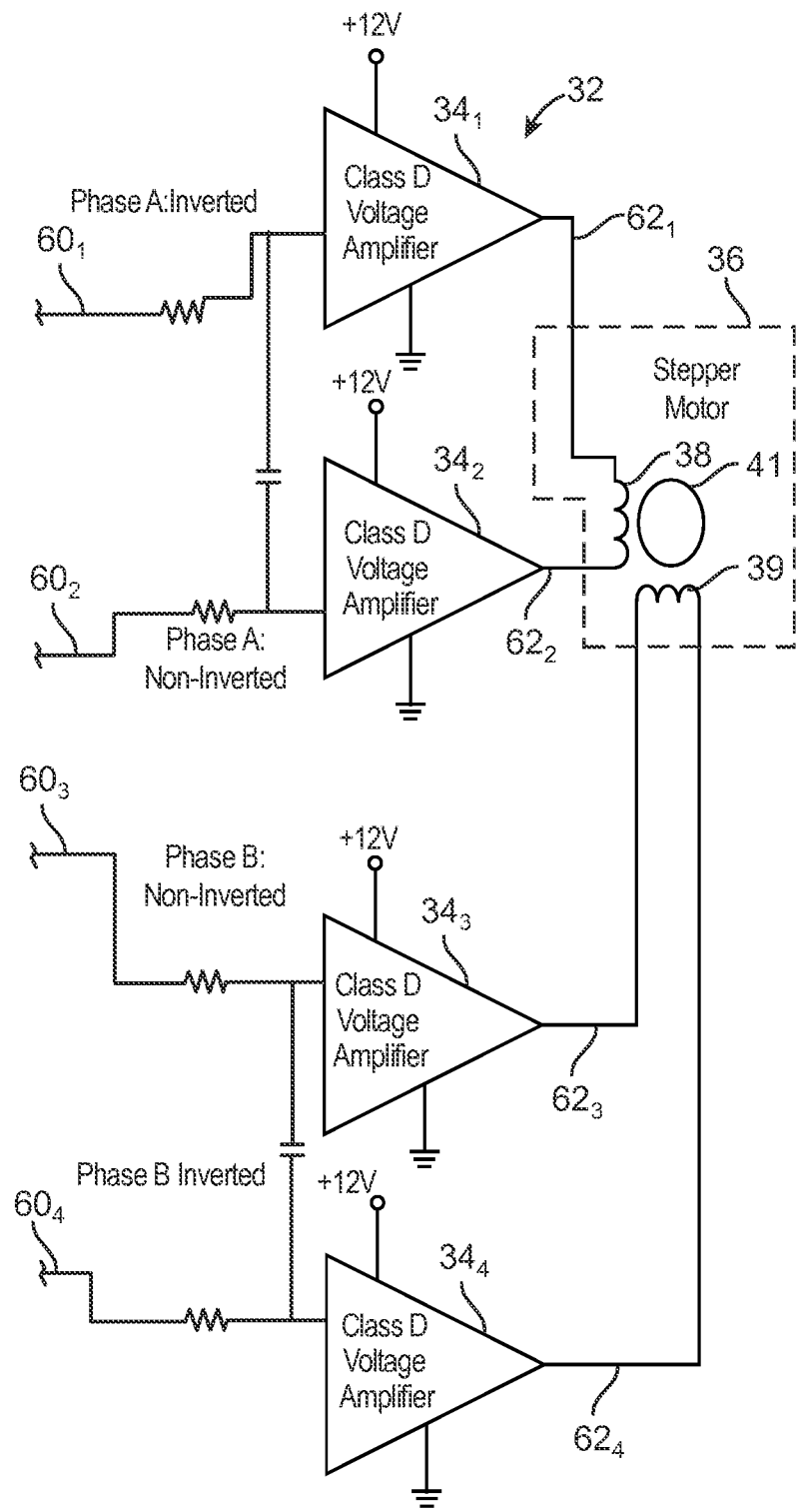
FIG. 3 is a schematic diagram of amplifiers and a stepper motor of the pan driver shown in FIG. 1.

Referring also to FIGS. 2-3, the pan driver 18 includes a digital signal processor (DSP) microcontroller 30, a set 32 of four voltage amplifiers 34, and a stepper motor 36. While the driver shown in FIGS. 2-3 is the pan driver 18, the same driver could be used as the tilt driver 20. Further, the driver shown in FIGS. 2-3 could be used for other applications for which stepper motors are currently used, e.g., for surgical equipment, 3D printers, industrial automation controls, machine tools, medical fluid infusion pumps, other fluid-dispensing equipment, etc., or for applications for stepper motors developed in the future. The DSP microcontroller 30 provides four analog outputs that are compensated in amplitude and phase for velocity-dependent effects of the motor 36. The DSP microcontroller 30 outputs are connected to the four voltage amplifiers 34 to drive pairs of the amplifiers 34 differentially, and the pairs of voltage amplifiers 34 are connected across respective first and second windings 38, 39 of the motor 36. The windings 38, 39 are disposed adjacent to an iron rotor 41 such that selective excitation of the windings 38, 39 will cause the rotor 41 to rotate due to changing attraction of the rotor 41 to the windings 38, 39. The voltage driver 18 presents a low, near-zero (near short circuit) impedance to the motor 36, while a current driver would present a very high (ideally, infinite) impedance to the motor 36. The low impedance of the voltage driver helps resist anomalies in motor velocity because perturbations of velocity and position will be opposed.

The DSP microcontroller 30 includes, among other things, motion profile control logic 40, an acceleration register 42, a velocity register 44, a position register 46, a phase correction or compensation module 48, a four quadrant (full cycle) quasi-sinusoidal waveform module 50, an amplitude module 52, DC sources 54, digital-to-analog converters (DACs) 56, and hardware multipliers 58. As the modules 48, 50, 52 respectively include a phase-compensation look-up table (LUT), a quasi-sinusoidal (pseudo-sinusoidal) LUT, and an amplitude scaling LUT, the modules 48, 50, 52 may be referred to as LUTs, although the modules include firmware or other entities for using the LUTs as described. The controller 30 includes hardware, firmware, and software (e.g., stored in memory of the control logic 40) configured to implement the functions described. The DSP microcontroller 30 is configured to process or generate indications of desired motion of the camera 16 and to provide voltage outputs to induce the desired corresponding motion of the motor 36.

The controller 30 provides direct digital synthesis (DDS), using digital data processing to generate frequency-tunable, phase-tunable, signals. The microcontroller 30 implements a DDS quadrature waveform generator in firmware. Waveform shapes are given in the waveform LUT 50, and applied to the DACs 56, which reconstruct an analog waveform. The LUT 50 comprises a table of integer constants stored in microcontroller memory. The integer constants can be selected to provide arbitrary waveshapes as desired. The digital domain control of the DDS technique can be used to control waveshape, amplitude, frequency, and phase of the voltage output signals. The waveform frequency determines the stepper motor angular velocity. The motor velocity is controlled by adjusting the DDS "tuning word." The tuning word, here the value of the velocity register 44, sets the rate at which the synthesizer sequences through the waveform LUT 50. Larger tuning words result in faster cycling through the LUT 50, and thus a higher frequency of the resulting waveform. The shape of the waveform is dictated by the values in the LUT 50 as selected according to phase accumulator values. The position register value provides an address into a phase accumulator 47. The phase accumulator accumulates (steps or updates) the phase at each sampling instant by adding a velocity variable (the "tuning word") to the prior phase value. The accumulated phase is provided to the LUT 50, which fetches the waveform's present amplitude using the present phase-adjusted position, and presents the amplitude to the DACs 56.

The DSP microcontroller 30 is configured to compensate for back-EMF induced by the motor 36 by adjusting the phase and amplitude of the voltages driving the windings 38, 39 as a non-linear function of the motor velocity. The controller 30 compensates for the velocity-dependent effects of the motor 36. As the velocity of the motor 36 increases, the back-EMF and the reactance of the windings 38, 39 increases. This in turn would cause a reduction in torque if not compensated for. The controller 30 compensates for these effects to induce substantially smooth, substantially noise-free winding current in the windings 38, 39. The DSP controller 30 is configured to select a phase and an amplitude of generated waveforms to produce currents to induce a position of the rotor 41 that matches a determined desired position indicated by the position register 46.

Figure 4:
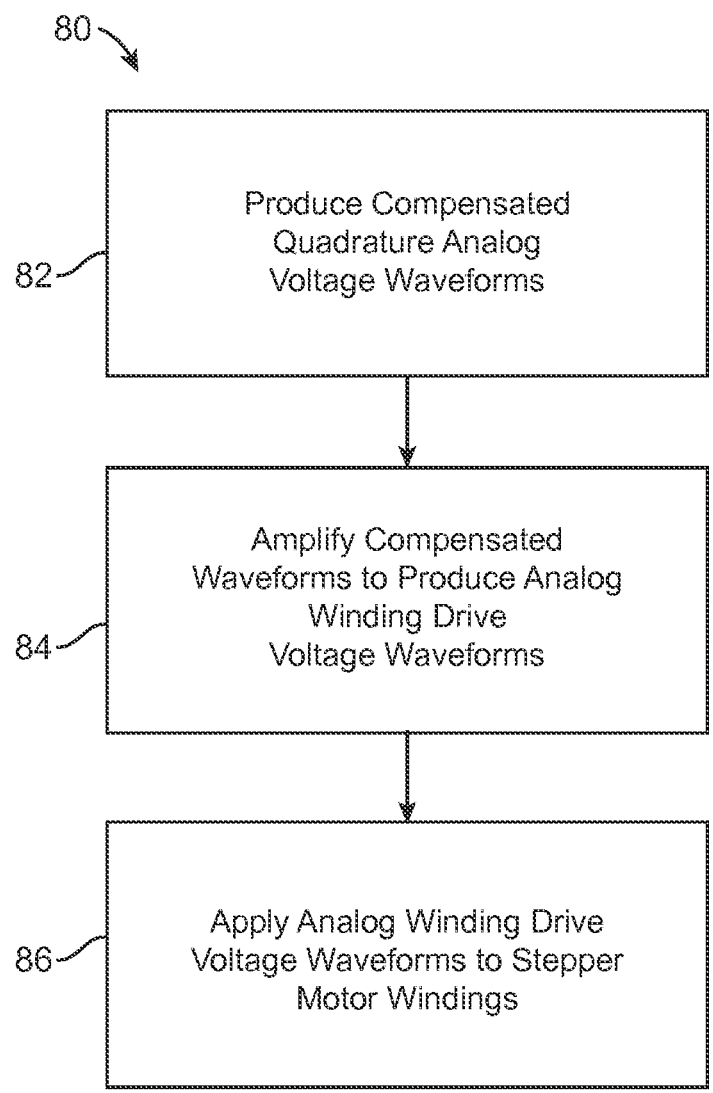
FIG. 4 is a block flow diagram of a process of driving the stepper motor shown in FIG. 3 with analog voltage signals.

Referring to FIG. 4, with further reference to FIGS. 1-3, a process 80 of driving the stepper motor 36 with analog voltage signals includes the stages shown. The process 80 is, however, an example only and not limiting. At stage 82, compensated quadrature analog voltage waveforms are produced. The DSP microcontroller produces analog voltage waveforms that are in quadrature, and that are compensated in phase and amplitude for velocity of the motor 36. At stage 84, the compensated waveforms are amplified by the amplifiers 34. At stage 86, the amplified signals are applied to the motor windings 38, 39 to induce motion of the rotor 41.

Figure 5:
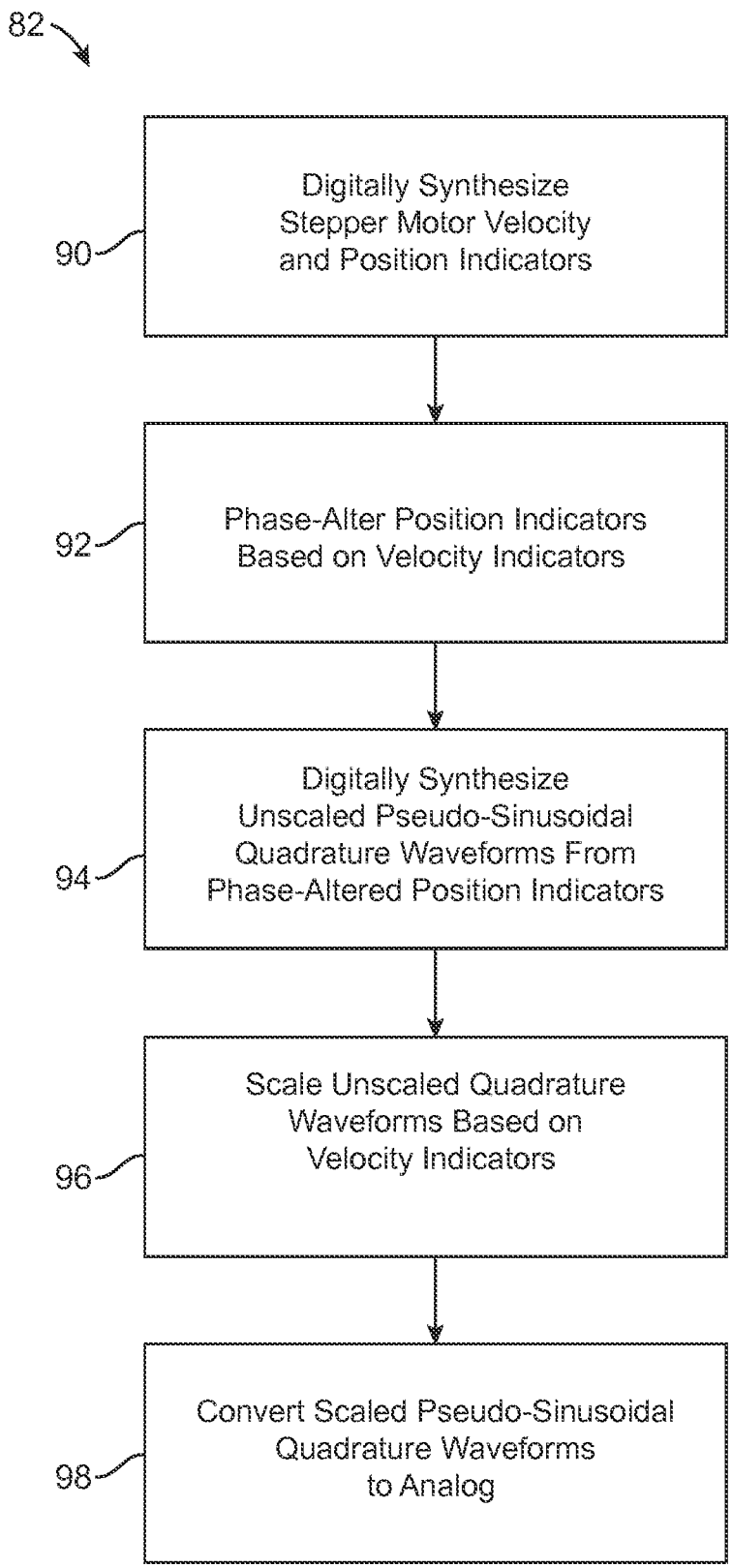
FIG. 5 is a block flow diagram of producing compensated quadrature analog voltage waveforms shown in FIG. 4.

Referring also to FIG. 5, stage 82 of producing compensated quadrature analog voltage waveforms includes the stages shown. These stages, however, are an example process only and not limiting.

At stage 90, the DSP controller 30 digitally synthesizes stepper motor velocity indications and stepper motor position indications. Values of the acceleration register 42, the velocity register 44, and the position register 46 represent the present state of the motor 36 in terms of acceleration, velocity and position, respectively. The DSP microcontroller 30 is a state machine that changes state once every sampling time interval. The sampling time is a design variable, and is a periodic signal provided to the controller 30 to cause an update of the state of the controller 30. For example, in the driver 18, an internal timer/counter of the controller 30 is used to generate an interrupt signal to the processor core. The core responds by executing an interrupt service routine (ISR) that performs the operations to update the driving waveform outputs. Every sampling time interval the velocity register 44 is updated by summing the previous value of the velocity register 44 with the acceleration register value, and the position register 46 is updated by summing the position register's previous value with the velocity register value. The motion profile control logic 40 controls the motion of the motor 36 by setting the acceleration register 42 to positive values, negative values, or zero at specific sample times. The control logic 40 can also set the value of the velocity register 44 as desired, but would preferably only implement small changes in velocity, to help avoid stalling the motor 36. A jerk register can also be provided, with the acceleration register value being the previous acceleration register value plus the jerk register value. The jerk register value thus indicates the acceleration of the acceleration of the motor 36. The jerk register value can be changed by the control logic 40, e.g., from zero to a positive value, or even an increasing positive value, as the velocity of the motor 36 increases. This helps avoid sudden acceleration from zero velocity while providing increasing accelerations with increasing velocity.

The value of the position register 42 is controlled to achieve the desired position of a load connected to the motor 36. A command is provided by the control circuitry 22 to the motion profile control logic 40. The logic 40 determines the direction to move (clockwise or counterclockwise) the motor 36 and implements an appropriate motion profile to ramp the velocity up and down until the present position of the load, as dictated by the position of the motor 36, is at the desired target position. The angular precision of the motor 36 is a design parameter, here being very fine, $1/256$ of a cardinal step of the stepper motor 36, with the cardinal step being $1/4$ of a cycle of the driving waveform of the stepper motor 36. The precision is determined by the resolution of the waveform's phase, i.e., the number of entries in the LUT 50 (more entries providing finer resolution, and thus a smaller microstep size, increasing the number of individual steps to implement a full cycle of the waveform). Smaller step sizes can reduce jitter, especially at slower speeds.

At stage 92, the LUT 48 phase-alters the position indications from the position register 46 based on the velocity indications from the velocity register 44. Since the back-EMF and winding reactance vary with the motor velocity, the transformation between winding current and winding voltage varies non-linearly with motor velocity. At each velocity value there is a fixed phase shift angle between the winding current and the voltage signals applied across the motor windings 38, 39. Therefore the DSP microcontroller 30 includes the non-linear phase compensation LUT 48. The LUT 48 provides phase shifts that are dependent upon characteristics of the motor 36 (e.g., back-EMF factor of the motor 36 (due to motor angular velocity and voltage generated, given in volts/radians/seconds), winding resistance, and winding inductive reactance) and the velocity of the motor 36. The non-linear LUT 48 is calibrated (e.g., to cancel induced phase angles at each rotor velocity) for the particular motor 36, preferably at the nominal winding current level for the application. This can be done experimentally, or by using provided characteristics of the motor 36. Different LUTs, i.e., with different entry values, are used for different motors 36 and/or different nominal winding current levels. The LUT 48 phase-alters the position indications before input to the LUT 50 to affect the shapes of the waveforms output by the LUT 50.

The phase shift transformation provided by the LUT 48 is applied before the pseudo-sinusoidal LUT 50, at the output of the position register 46. Based on the present value of the velocity register 44, a phase compensation value is read from the non-linear phase compensation LUT 48, and this phase compensation value is added to the position value to phase shift both of the winding signals to compensate for the back-EMF induced by movement of the motor 36.

The phase-altered position indications are split into quadrature indications. Because the currents in the windings 38, 39 are in quadrature, i.e., 90 degrees out of phase with respect to each other, the current value for the first and second windings 38, 39 are different. To find the winding current value for the second winding 39, the position value of the position register 46, used to find the current value for the first winding 38, is shifted by one cardinal step before being applied to the non-linear pseudo-sinusoidal lookup table 50. The position indication is split (duplicated) and a 90° phase shift is introduced to one of the position indications to produce two phase-altered position indications in quadrature phase with respect to each other. The phase-altered quadrature position indications are input to the LUT 50.

At stage 94, the LUT 50 digitally synthesizes unscaled pseudo-sinusoidal quadrature waveforms using the phase-altered position indications. To translate the position register value to motor winding current values for that position, the non-linear pseudo-sinusoidal LUT 50 is used. The LUT 50 is a waveform LUT that holds a sampled, integer representation of the driving waveform, i.e., a table of constants stored in program memory. The number of samples (record length) and the number of bits (resolution) are design variables that are tailored to the application's requirements. The LUT 50 is used to translate step and microstep coordinates into near-sinusoidal winding current values to induce the corresponding desired movement of the rotor 41, based on known relationships of the winding currents and rotor position. Here, as an example, the LUT 50 includes 1,024 10-bit entries encoding amplitude values for a full 360-degree waveform. Other implementations are possible, e.g., for waveforms that are symmetrical in four quadrants, entries for 90° of the waveform can be used, with a two-bit code used to indicate the polarity of the signal and the direction to proceed through the table. The winding current value found using the position and the LUT 50 will be used to provide a voltage to the first winding 38 of the motor 36. Outputs 51 of the LUT 50 are pseudo-sinusoidal digital winding driver signals indicative of analog pseudo-sinusoidal voltage signals to be applied to the windings 38, 39.

The translation discussed so far is a translation from desired position to desired winding current calculated based on the state of the position register 46 at the sample time. The stepper motor 36, however, is driven by the voltage amplifiers 34 with analog voltage waveforms. Therefore, the DSP microcontroller 30 is configured to convert the winding current signals into voltage signals, here in the LUT 50 and the multipliers 58.

The transformation of current to voltage is non-linear, and is based on resistance of the windings 38, 39, inductance of the windings 38, 39, and a back-EMF voltage of the motor 36. For a constant speed state of the motor 36, the magnitude of winding current $I_M$ is given by:

$$|I_M|^2 = \frac{[V_D - V_{BY}]^2 + V_{BX}^2}{R_M^2 + X_M^2} \tag{1}$$

where:

$V_D$ is the output voltage of the motor driver applied to a winding;

$V_{BX}$ is the component of the motor back-EMF in phase with the drive voltage;

$V_{BY}$ is the component of the motor back-EMF in quadrature with the drive voltage;

$R_M$ is the resistance of the motor winding under consideration; and $X_M$ is the reactance of the motor winding under consideration.

At stage 96, the LUT 52 scales the unscaled pseudo-sinusoidal quadrature waveforms from the LUT 50 based on the velocity indications from the velocity register 44. As with the phase shift discussed above, at each velocity value there is a fixed magnitude gain between the winding current and the voltage pseudo-sinusoidal signals across the motor windings 38, 39. Therefore the DSP microcontroller 30 includes the non-linear amplitude transformation LUT 52. The LUT 52 provides amplitude adjustments that are dependent upon characteristics of the motor 36 (including winding resistance, winding inductance, and back-EMF for the motor 36) and the velocity of the motor 36 to keep the winding current at the target level as a function of velocity (waveform frequency). The non-linear LUT 52 is calibrated for the particular motor 36, preferably at the nominal winding current level for the application. Different LUTs, i.e., with different entry values, are used for different motors 36 and/or different nominal winding current levels.

The amplitude transformation is applied after the pseudo-sinusoidal LUT 50. Based on the present value of the velocity register 44, an amplitude scaling value is read from the non-linear amplitude scaling LUT 52. This amplitude scaling value is applied to multipliers 58 to multiply the scaling value by each of the two quadrature outputs 51 of the pseudo-sinusoidal LUT 50 to generate scaled quadrature voltage signals 59. The signals 59 provide the appropriate voltages, according to Eqn. (1), to induce the currents determined using the LUT 50.

With the motor 36 at a stop or at low velocity, the phase compensation is zero and the amplitude scaling factor is equal to a constant, which is equal to the motor winding resistance. At a stop or at low velocity, the winding-current-to-voltage transformation is very constant over velocity, and very accurate. Therefore at a stop or at low velocity, the error between the position register 46 and the actual motor angular position is very small, on the order of a few milli-degrees.

With the phase compensation applied to the position signal, and the amplitude scaling transformations applied to the quadrature winding current signals 51, the result is the pair of quadrature winding voltage signals 59. These two voltage signals 59 are used to apply voltages to the motor windings 38, 39 at each sample time to generate the desired motor winding currents to help keep the motor angular position in synchronization with the position register 46 at each sample period.

Since each of the motor windings 38, 39 is driven differentially from two voltage amplifiers, the DSP microcontroller 30 is configured to produce a second inverted voltage signal for each of the windings 38, 39. Each of the signals $59_1$, $59_2$ is inverted by having a 2's complement taken (after being divided by 128, as shown). Further, the controller 30 applies a DC bias from each of the DC sources $54_1$-$54_4$ to the voltage signals and the inverted voltage signals. The DC bias is selected to bias each of the outputs of the amplifiers 34 at a midpoint of a unipolar power supply.

At stage 98, the DC-biased signals are converted from digital to analog for application to the windings 38, 39. The DC-biased voltages are converted from digital form to analog form by the DACs $56_1$-$56_4$, providing four analog output voltage signals $60_1$-$60_4$ from the DSP microcontroller 30.

Referring again to FIG. 4, at stage 84, the compensated waveforms from the controller 30 are amplified to produce analog winding drive voltage waveforms. The waveforms 60 output by the controller 30 are provided to respective ones of the amplifiers 34. Here, the amplifiers 34 are class-D amplifiers. The inputs to the amplifiers 34 are the analog signals 60, passed through shunt resistances. The amplifiers 34 modulate signals on and off to amplify the input signals. The modulated signals are filtered, providing smooth, pseudo-sinusoidal analog output voltage signals 62.

At stage 86, the signals amplified by the class-D amplifier circuits 34 and output as the signals 62 are applied to the motor windings 38, 39. Unlike with current-controlled drivers, the voltage-controlled drivers of FIG. 2 do not employ a current shunt in series with the motor windings 38, 39.

Experimental Results

Figure 6A:
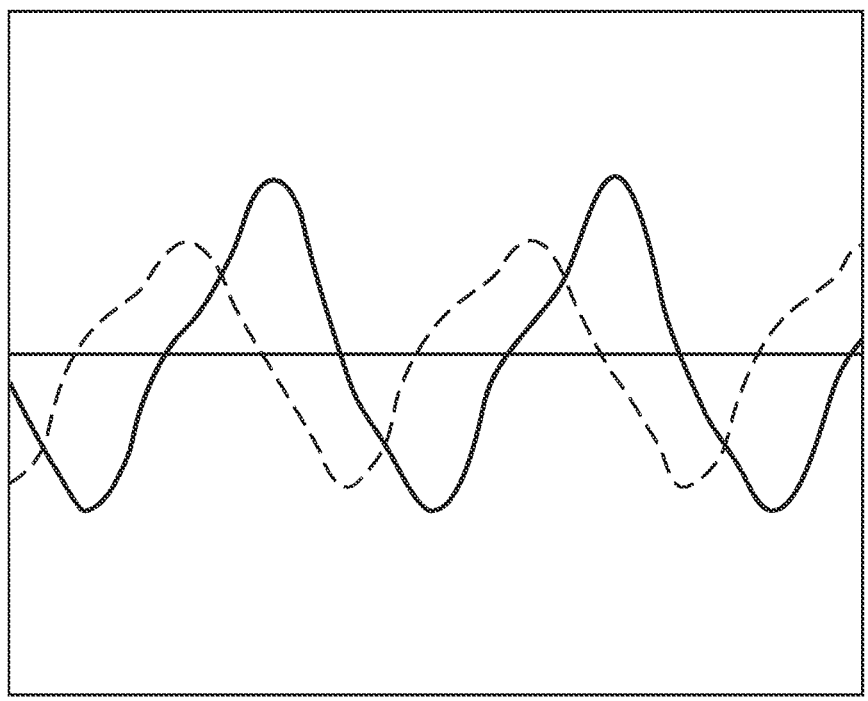
FIGS. 6A-6B are experimental results of stepper motor winding current when driven by a current-controlled stepper motor driver (FIG. 6A) and stepper motor winding current when driven by a voltage-controlled stepper motor driver (FIG. 6B).
Figure 6B:
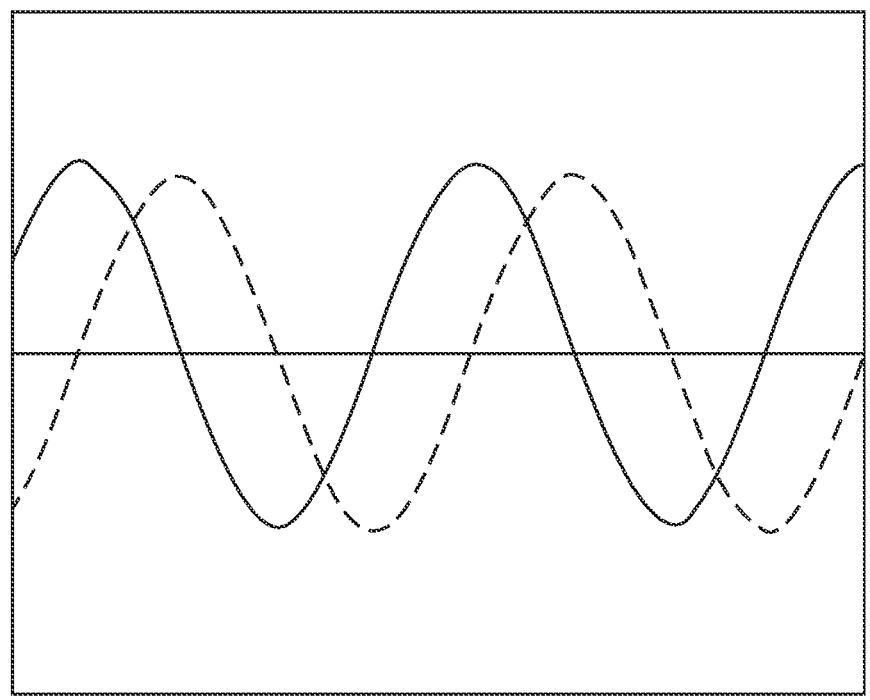
Figure 7:
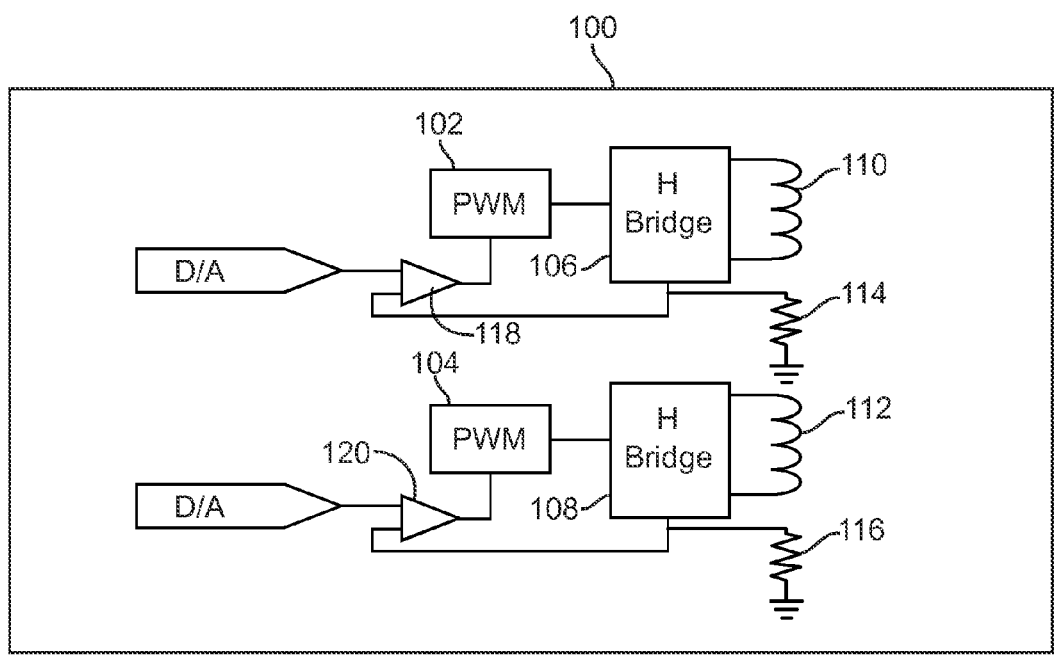
FIG. 7 is a block diagram of a current-controlled stepper motor driver.

FIGS. 6A-6B show experimental results comparing winding signal waveforms of a current-controlled driver and of the driver 18. As seen in FIG. 6A, heavy harmonic distortion is present in this current-controlled driver, inducing erratic position control, and thus position inaccuracy, and noise and vibration in the motor. Conversely, as seen in FIG. 6B, the driver 18 provides smooth, consistently-spaced quadrature driver signals leading to accurate position control and smooth motion of the motor 36.

Other Considerations

Variations and modifications to the specific examples given can be made without departing from the scope of the disclosure or claims. The specific examples disclosed herein are not liming of the following claims. For example, while the description above described compensation of both phase and amplitude of the synthesized waveforms as a function of stepper motor velocity, implementations can be used that compensate for phase or amplitude, but not both, by removing the respective components discussed above.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. In an embodiment implemented using a computer system, various computer-readable media might be involved in providing instructions/code to a processor(s) for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory. Transmission media include, without limitation, coaxial cables, copper wire and fiber optics. Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system. These signals, which might be in the form of electromagnetic signals, acoustic signals, optical signals and/or the like, are all examples of carrier waves on which instructions can be encoded, in accordance with various configurations of the invention.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Further, the preceding description details a security camera system. However, the systems and methods described herein may be applicable to other forms of camera systems, or other systems generally.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the techniques discussed. Also, a number of steps may be undertaken before, during, or after the above elements are considered. Accordingly, the above description does not bound the scope of the claims.

Further, more than one invention may be disclosed.

What is claimed is:

1. A stepper motor driver system comprising:
a digital signal controller configured to digitally synthesize a plurality of synthesized analog voltage signals that will induce a desired velocity of a stepper motor when applied to a pair of stepper motor windings; and
a plurality of voltage amplifiers, communicatively coupled to the digital signal controller, configured to amplify the plurality of synthesized analog voltage signals to produce a plurality of amplified analog voltage signals and to output the amplified analog voltage signals;
wherein the digital signal controller is configured to synthesize the plurality of analog voltage signals by affecting a phase and an amplitude of each of the plurality of analog voltage signals as a function of the desired velocity of the stepper motor;
wherein the digital signal controller comprises:
a non-linear phase-compensation module configured to provide phase-compensation values corresponding to stepper motor velocity values;
a non-linear amplitude-scaling module configured to provide amplitude-scaling values corresponding to the stepper motor velocity values; and
a waveform module configured to provide quasi-sinusoidal waveform values corresponding to stepper motor position values;
wherein the digital signal controller is configured to:
determine a present desired stepper motor velocity;
determine a present phase-compensation value corresponding to the present desired stepper motor velocity using the phase-compensation module;
apply the present phase-compensation value to a present position value to produce a phase-corrected position value;
determine a waveform value corresponding to the phase-corrected position value using the waveform module;
determine a present amplitude-scaling value corresponding to the present desired stepper motor velocity using the amplitude-scaling module; and
scale the waveform value using the present amplitude-scaling value to produce a plurality of amplified analog voltage signals.

2. The system of claim 1 wherein the phase-compensation module includes a non-linear look-up table of the phase-compensation values and corresponding desired stepper motor velocity values.

3. The system of claim 1 wherein the digital signal controller comprises an amplitude-scaling module includes a non-linear amplitude-scaling look-up table of the amplitude-scaling values and corresponding desired stepper motor velocity values.

4. The system of claim 1 wherein:
the waveform module includes a waveform look-up table of the quasi-sinusoidal waveform values and the corresponding desired stepper motor position values.

5. The system of claim 1 wherein:
the plurality of voltage amplifiers are class-D amplifiers fed by a supply voltage;
the digital signal processor comprises a corresponding plurality of bias sources and a corresponding plurality of digital-to-analog converters (DACs); and
the bias sources are coupled and configured to bias signals input to the DACs such that the amplified analog voltage signals are biased to a midpoint of the supply voltage.

6. The system of claim 1 wherein the plurality of amplified analog voltage signals have pseudo-sinusoidal shapes.

7. The system of claim 1 further comprising the stepper motor communicatively coupled to the plurality of voltage amplifiers, the plurality of voltage amplifiers consisting of four voltage amplifiers arranged in two pairs with each pair of voltage amplifiers configured and coupled across a respective winding of the stepper motor.

8. A stepper motor system comprising:
a stepper motor comprising first and second windings and an iron rotor;
synthesizing means for digitally synthesizing first pseudo-sinusoidal analog voltage signals in quadrature with respect to each other; and
amplifying means, communicatively coupled to the synthesizing means and the stepper motor, for amplifying the first pseudo-sinusoidal analog voltage signals to produce second amplified pseudo-sinusoidal analog voltage signals and for providing the second amplified pseudo-sinusoidal analog voltage signals to the first and second windings of the stepper motor;

wherein to produce the first pseudo-sinusoidal analog voltage signals, the synthesizing means include means for:

digitally synthesizing stepper motor velocity indications and corresponding stepper motor position indications;

altering the stepper motor position indications based on the corresponding stepper motor velocity indications to produce phase-compensated position indications;

digitally synthesizing first and second unscaled pseudo-sinusoidal voltage waveforms based on the phase-compensated position indications, the first and second unscaled pseudo-sinusoidal voltage waveforms being in quadrature phase with respect to each other;

scaling the first and second unscaled voltage waveforms based on amplitude-scaling values corresponding to the stepper motor velocity indications to produce first and second scaled pseudo-sinusoidal waveforms; and converting the first and second scaled pseudo-sinusoidal waveforms from digital to analog to produce first and second scaled pseudo-sinusoidal analog waveforms as the first pseudo-sinusoidal analog voltage signals; and wherein the amplifying means are configured to amplify the first and second scaled pseudo-sinusoidal analog waveforms to produce the second pseudo-sinusoidal analog voltage signals.

9. The system of claim 8 wherein the synthesizing means comprise:

a non-linear phase-compensation look-up table of phase-compensation values and corresponding stepper motor velocity values;

a non-linear amplitude-scaling look-up table of amplitude-scaling values and corresponding desired stepper motor velocity values; and a waveform module including a waveform look-up table of quasi-sinusoidal waveform values and corresponding position values.

10. A method of controlling a stepper motor, the method comprising:

producing first and second compensated analog voltage waveforms in quadrature phase with respect to each other;

amplifying the first and second analog voltage waveforms to produce first and second analog winding drive voltage waveforms; and applying the first and second analog winding drive voltage waveforms to first and second windings, respectively, of a stepper motor;

wherein the first and second compensated analog voltage waveforms being compensated for at least one of phase or amplitude as a function of a velocity of a rotor of the stepper motor;

wherein producing the first and second compensated analog voltage waveforms comprises:

digitally synthesizing stepper motor velocity indications and corresponding stepper motor position indications;

altering the stepper motor position indications based on the corresponding stepper motor velocity indications to produce phase-compensated position indications;

digitally synthesizing first and second unscaled pseudo-sinusoidal voltage waveforms based on the phase-compensated position indications, the first and second unscaled pseudo-sinusoidal voltage waveforms being in quadrature phase with respect to each other;

scaling the first and second unscaled voltage waveforms based on amplitude-scaling values corresponding to the stepper motor velocity indications to produce first and second scaled pseudo-sinusoidal waveforms; and converting the first and second scaled pseudo-sinusoidal waveforms from digital to analog to produce first and second scaled pseudo-sinusoidal analog waveforms as the first and second compensated analog voltage waveforms.

11. The method of claim 10 further comprising amplifying the first and second scaled pseudo-sinusoidal analog waveforms to produce the first and second analog winding drive voltage waveforms.

* * * * *